US010300812B2

(12) United States Patent
Flieger et al.

(10) Patent No.: US 10,300,812 B2
(45) Date of Patent: May 28, 2019

(54) ADJUSTING DEVICE HAVING AN ADJUSTING MECHANISM ARRANGED ON A GUIDE RAIL

(71) Applicant: Brose Fahrzeugteile GmbH & Co. KG, Coburg, Coburg (DE)

(72) Inventors: Michael Flieger, Coburg (DE); Stefan Bosecker, Sonneberg (DE); Sergej Kostin, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 697 days.

(21) Appl. No.: 14/871,821

(22) Filed: Sep. 30, 2015

(65) Prior Publication Data
US 2016/0114704 A1 Apr. 28, 2016

Related U.S. Application Data

(62) Division of application No. 13/577,896, filed as application No. PCT/EP2010/067321 on Nov. 11, 2010, now Pat. No. 9,180,795.

(30) Foreign Application Priority Data

Feb. 11, 2010 (DE) .......................... 10 2010 001 847
Sep. 1, 2010 (WO) ................. PCT/EP2010/005610

(51) Int. Cl.
F16H 25/20 (2006.01)
B60N 2/06 (2006.01)
B60N 2/07 (2006.01)

(52) U.S. Cl.
CPC ............... *B60N 2/067* (2013.01); *B60N 2/07* (2013.01); *F16H 25/20* (2013.01); *Y10T 29/49826* (2015.01); *Y10T 74/18576* (2015.01)

(58) Field of Classification Search
CPC ...................................................... F16H 25/20
(Continued)

(56) References Cited

U.S. PATENT DOCUMENTS 5,941,494 A 8/1999 Garrido
6,915,998 B2 7/2005 Borbe et al.
(Continued)

FOREIGN PATENT DOCUMENTS

CN 1458008 11/2003
CN 1843803 A 10/2006
(Continued)

OTHER PUBLICATIONS

English translation of IPRP of corresponding International application PCT/EP2010/067321, dated Aug. 14, 2012, 9 pages.
(Continued)

*Primary Examiner* — William C Joyce
(74) *Attorney, Agent, or Firm* — Lewis Roca Rothgerber Christie LLP

(57) ABSTRACT

An adjusting device for adjusting two vehicle parts relative to each other is provided. The adjusting device comprising a first guide rail, which is longitudinally extended along a longitudinal axis and which is formed by a base and lateral legs connected to the base, a second guide rail, which is movably arranged on the first guide rail and which is longitudinally extended along the longitudinal axis, an adjusting mechanism, which is arranged between the legs on the first guide rail and which comprises a spindle nut, which can be rotated about the longitudinal axis in order to drive the adjusting device, a spindle, which is arranged in a rotationally fixed manner on the second guide rail and which is longitudinally extended along the longitudinal axis and which engages with the spindle nut in such a way that, when the spinal nut is rotated, the first guide rail is moved along
(Continued)

the longitudinal axis relative to the second guide rail, and a fastening device for fastening the adjusting mechanism to the first guide rail.

8 Claims, 15 Drawing Sheets

(58) Field of Classification Search
USPC .................. 74/89.23, 89.34; 297/312, 344.1
See application file for complete search history.

(56) References Cited

U.S. PATENT DOCUMENTS

| 7,051,986 | B1 | 5/2006 | Taubmann et al. |
|---|---|---|---|
| 7,198,243 | B2 * | 4/2007 | Hofschulte .......... B60N 2/0232 248/429 |
| 2003/0141737 | A1 | 7/2003 | Nishimoto et al. |
| 2004/0206878 | A1 | 10/2004 | Borbe et al. |
| 2005/0082890 | A1 | 4/2005 | Taubmann et al. |
| 2006/0150758 | A1 | 7/2006 | Wohrle et al. |
| 2006/0158002 | A1 | 7/2006 | Long |
| 2006/0213302 | A1 | 9/2006 | Hoffman et al. |
| 2006/0249644 | A1 | 11/2006 | Folliot et al. |
| 2008/0105810 | A1 | 5/2008 | Hofschulte et al. |
| 2008/0282822 | A1 | 11/2008 | Birker et al. |
| 2010/0133408 | A1 | 6/2010 | Umezaki et al. |
| 2012/0325033 | A1 | 12/2012 | Bosecker et al. |

FOREIGN PATENT DOCUMENTS

| CN | 101130344 A | 2/2008 |
|---|---|---|
| CN | 101178116 A | 5/2008 |
| DE | 1755740 | 1/1972 |
| DE | 29513272 U1 | 1/1997 |
| DE | 19815283 C2 | 10/1999 |
| DE | 19861100 B4 | 2/2000 |
| DE | 19942973 A1 | 3/2001 |
| DE | 10139631 A1 | 3/2003 |
| DE | 10230514 B4 | 1/2004 |
| DE | 10337475 A1 | 3/2005 |
| DE | 10353245 A1 | 6/2005 |
| DE | 10-2006-011717 B4 | 10/2006 |
| DE | 10-2006-011718 A1 | 10/2006 |
| DE | 10-2006-049807 A1 | 4/2008 |
| DE | 10-2006-049809 A1 | 4/2008 |
| DE | 10-2007-023329 A1 | 11/2008 |
| DE | 20-2007-011851 U1 | 2/2009 |
| DE | 10-2007-059744 A1 | 6/2009 |
| EP | 0759374 A2 | 2/1997 |
| EP | 1442923 A2 | 8/2004 |
| EP | 1 679 223 B1 | 7/2006 |
| EP | 2070761 A2 | 6/2009 |
| FR | 2872747 A1 | 1/2006 |
| FR | 2882974 | 9/2006 |
| FR | 2882975 | 9/2006 |
| FR | 2882975 A1 | 9/2006 |
| FR | 2908698 A1 | 5/2008 |
| FR | 2 926 263 | 7/2009 |
| FR | 2926264 A1 | 7/2009 |
| JP | 02-296543 A | 12/1990 |
| JP | 04-057436 | 5/1992 |
| JP | 05-037553 | 5/1993 |
| JP | 2006-290131 A | 10/2006 |
| JP | 2007-510099 A | 4/2007 |
| WO | WO 2009-092946 A2 | 7/2009 |
| WO | WO 2009/092946 A2 | 7/2009 |

OTHER PUBLICATIONS

English translation of Japanese Examination Report for Application No. 2012-552275, dated Nov. 4, 2014, 2 pages.
Czech Search Report dated Mar. 26, 2013 for Application No. PV 2012-546, 2 sheets.
Chinese Office action for Application No. CN 201080066121.6, dated Jul. 1, 2014, 11 pages and English translation of the Summary of the First Office Action for Application No. CN 201080066121.6, 3 sheets.
Chinese First Office action dated Mar. 22, 2017 issued in corresponding CN Application No. 201510686287.2, with Search Report, 5 pages, and English translation, 5 pages.

* cited by examiner

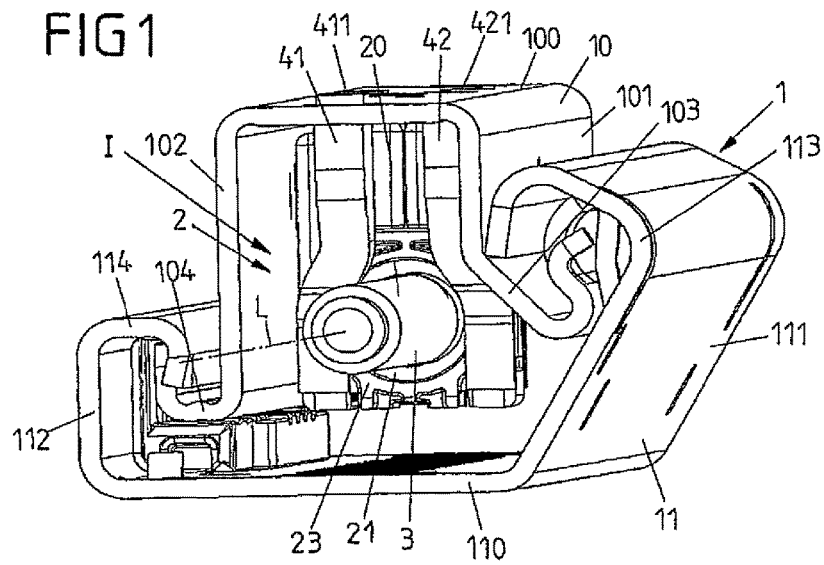
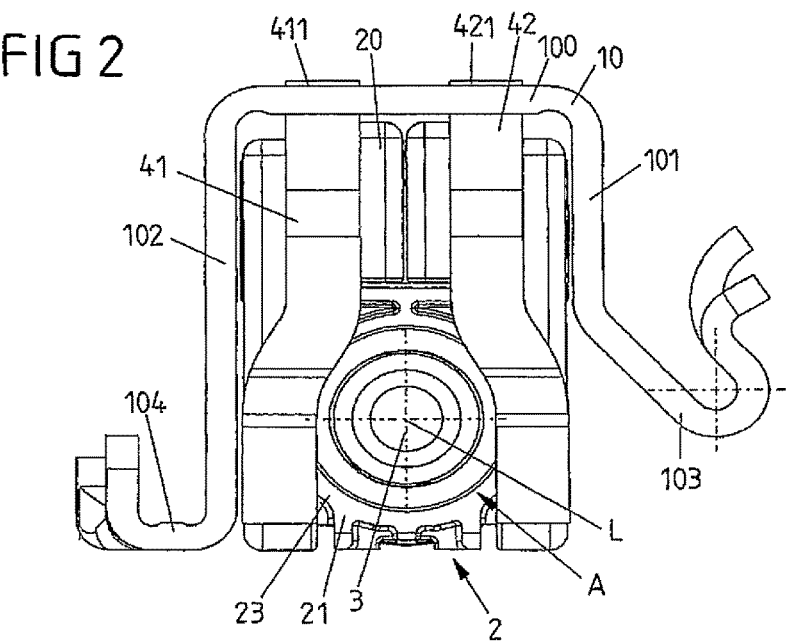

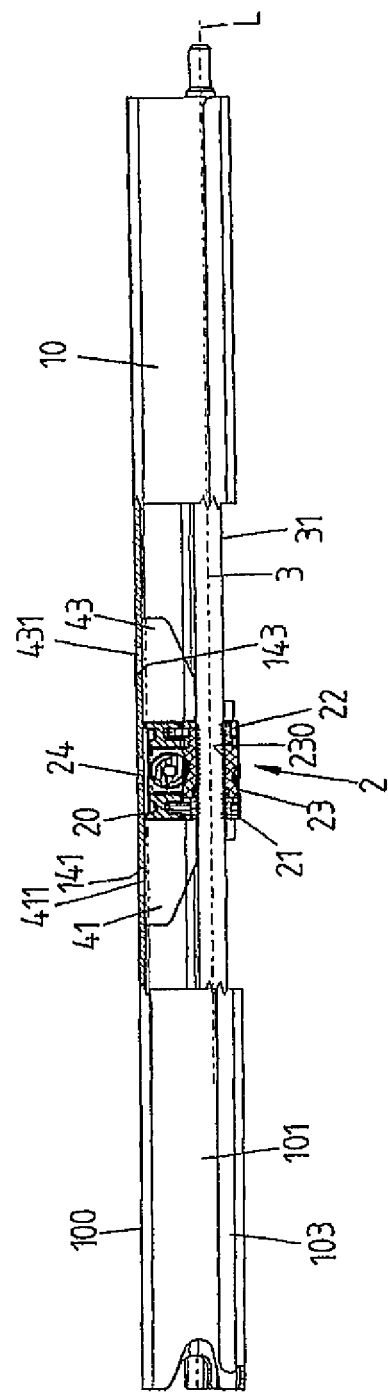

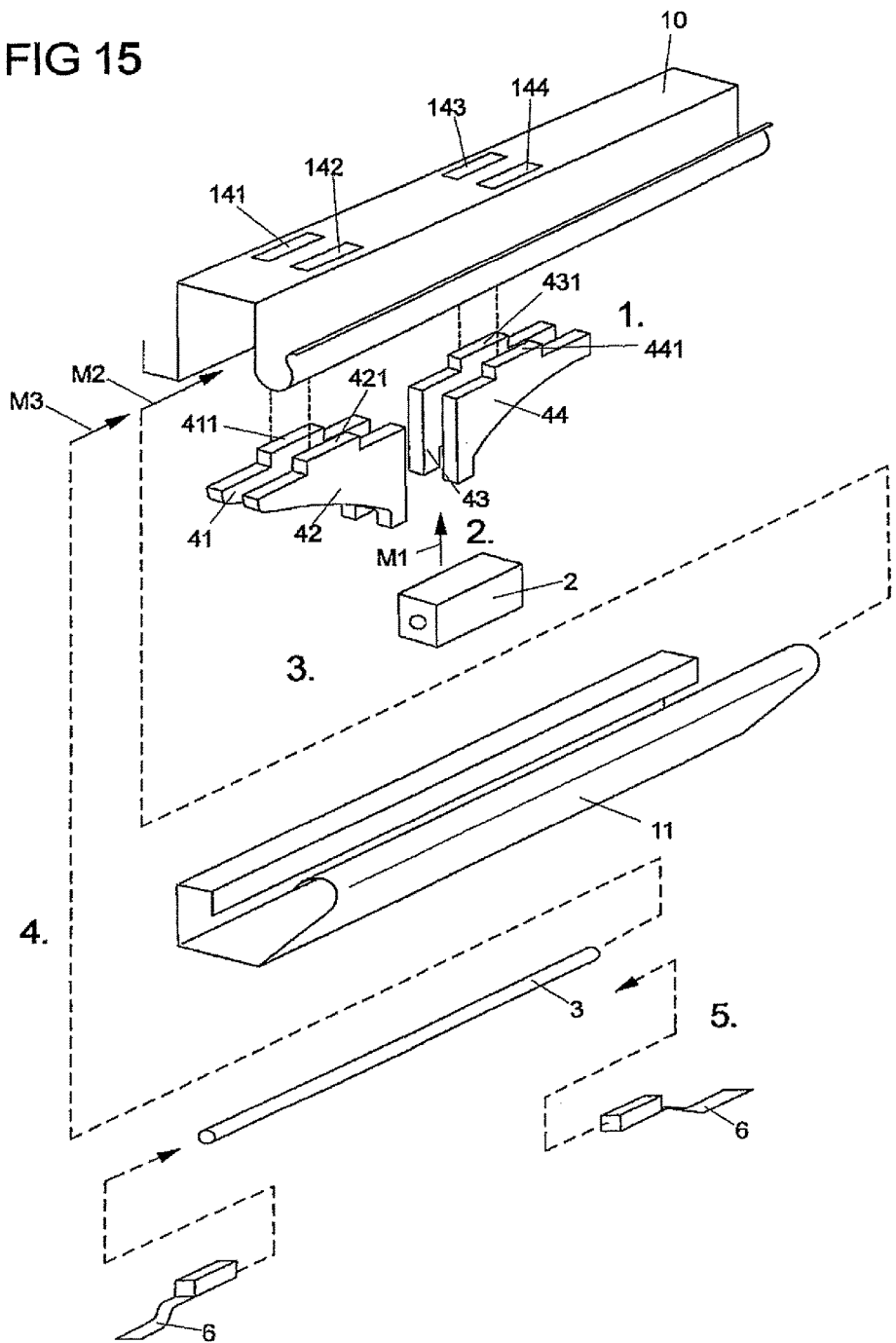

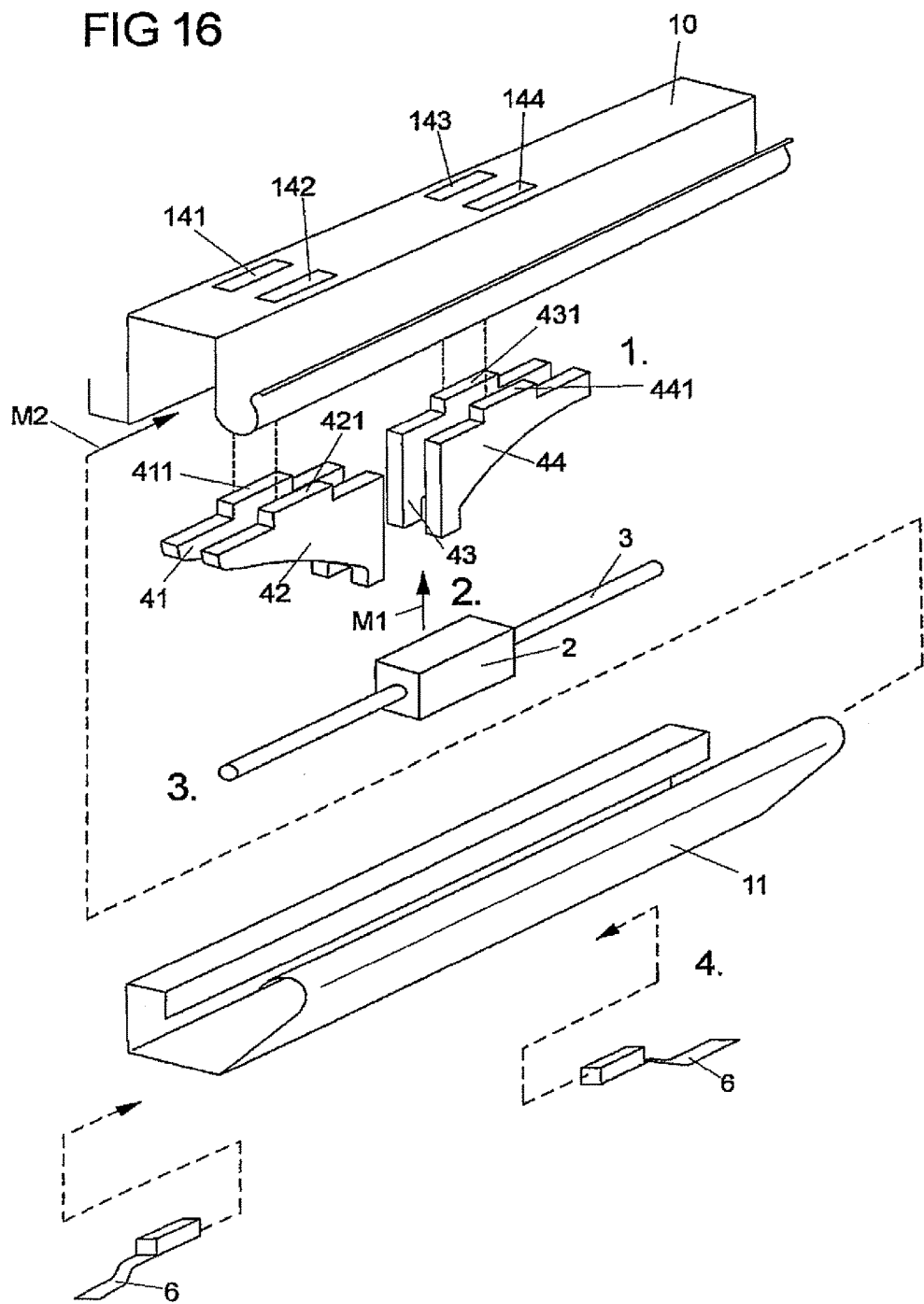

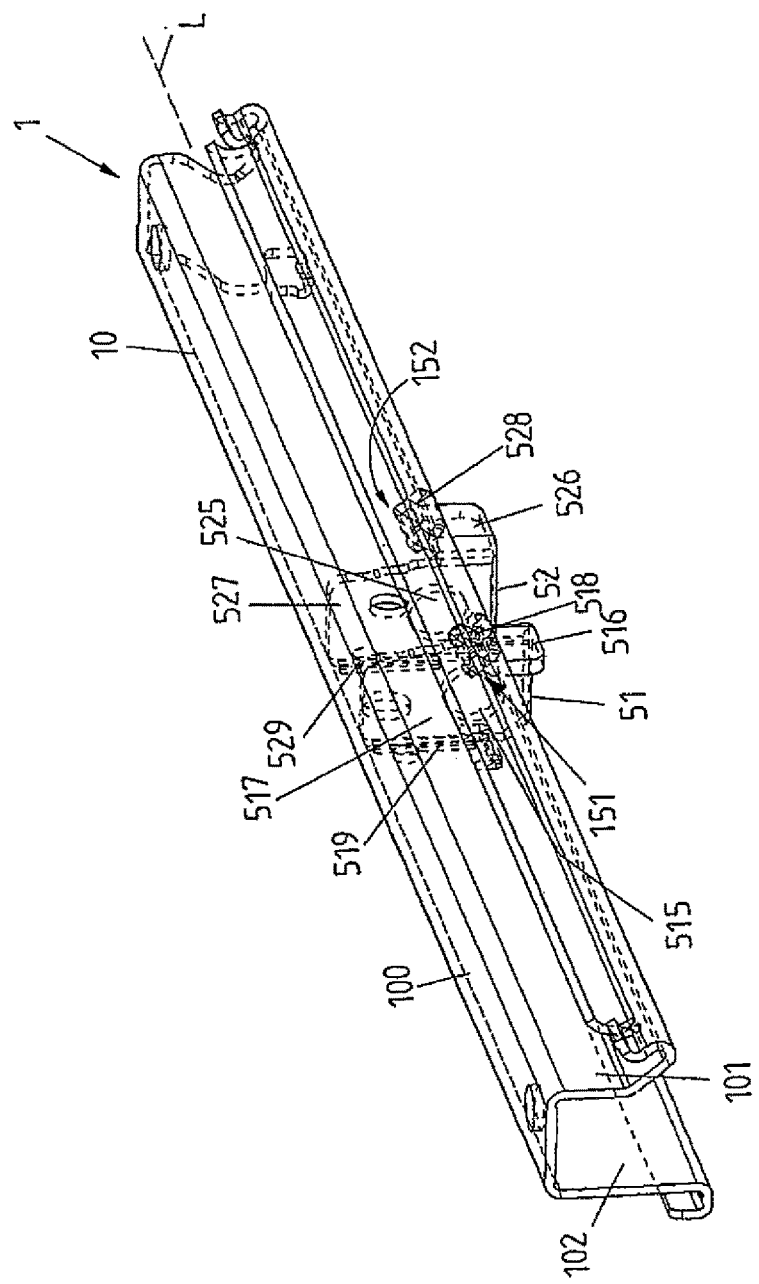

ADJUSTING DEVICE HAVING AN ADJUSTING MECHANISM ARRANGED ON A GUIDE RAIL

CROSS-REFERENCE TO RELATED APPLICATION(S)

This application is a divisional application of U.S. patent application Ser. No. 13/577,896, filed Oct. 15, 2012, which is a National Phase patent application of International Patent Application Number PCT/EP2010/067321, filed on Nov. 11, 2010, which claims priority of German Patent Application Number 10 2010 001 847.3, filed on Feb. 11, 2010 and of International Patent Application Number PCT/EP2010/005610, filed on Sep. 1, 2010. The entire contents of all of which are hereby expressly incorporated by reference.

BACKGROUND

The invention relates to an adjusting device for adjusting two vehicle parts relative to each other.

Such an adjusting device comprises a first guide rail longitudinally extending along a longitudinal axis and a second guide rail movably arranged on the first guide rail and longitudinally extending along the longitudinal axis. Both guide rails can, for instance, serve for connecting a vehicle seat to a vehicle floor and can allow a movement of the vehicle seat in vehicle longitudinal direction within a longitudinal adjustment of the vehicle seat. The first guide rail is essentially U-shaped in the cross section thereof transverse to the longitudinal axis and comprises for this purpose a base and two lateral legs extending essentially parallel to each other, which form the profile of the guide rail. The second guide rail is slidably mounted on the first guide rail, wherein for instance a ball bearing can be provided for a frictionless adjustability.

Both guide rails are adjustable relative to each other via a spindle gear. An adjusting mechanism is arranged for this purpose between the legs on the first guide rail, wherein said adjusting mechanism comprises a spindle nut, which can be set into a rotation about the longitudinal axis for driving the adjusting device and engages with a spindle arranged torque-proof on the second guide rail also longitudinally extending along the longitudinal axis. The spindle comprises for this purpose for instance an external thread on the outside surface thereof, which engages with an internal thread arranged on a drilled hole of the spindle nut in such a way that when rotating the spindle nut said spindle nut rolls off from the spindle and thus the first guide rail moves along the longitudinal axis relative to the second guide rail.

The adjusting mechanism is inserted into an interior space of the first guide rail formed between the legs of the first guide rail and is retained between the legs, wherein a fastening device for fastening the adjusting mechanism on the first guide rail is provided.

In case of an adjusting device known from DE 103 37 475 A1 an adjusting mechanism of this type is connected to the first guide rail via a fixing bracket, wherein the fixing bracket encompasses the adjusting mechanism in a U-shaped manner such that the adjusting mechanism is supported along the longitudinal axis. The fastening device is formed in this case by the fixing bracket with lateral legs encompassing the adjusting mechanism, wherein fastening flanges are aligned to the legs, via which the fastening bracket with fastening openings arranged thereon can be connected to the first guide rail via screw connections.

In case of an adjusting device known from DE 10 2006 011 718 A1 an adjusting mechanism is arranged on a first guide rail via a fastening bracket, wherein the adjusting mechanism projects through the first guide rail with a cone-like bulge and the fastening bracket is crimped on the first guide rail.

Further embodiments of adjusting mechanisms are for instance known from DE 10 2006 049 809 A1 and DE 10 2007 023 329 A1 and WO 2009/092946 A2 discloses another embodiment of a fastening bracket.

In case of the known adjusting devices a fastening device is provided in particular in form of a fastening bracket made of metal in order to provide a secure fastening of the adjusting mechanism on the first guide rail. During assembly, at first, the fastening bracket is arranged on the adjusting mechanism, the spindle is guided through openings on the fastening bracket and is positioned on the adjusting mechanism, and the provided component group consisting of adjusting mechanism, spindle and fastening bracket is inserted into the already assembled guide rail pair in order to connect the fastening bracket to the first guide rail by attaching screw connections or by crimping.

In case of the conventional adjusting devices the fastening bracket has to be designed to introduce forces acting when operating the adjusting device into the first guide rail and to guarantee a secure support in particular also in case of the crash, thus at an increased load, wherein for this purpose a targeted deformation of the fastening bracket can be provided, wherein as a result thereof the fastening bracket engages directly with the spindle and provides a support of the first guide rail on the spindle connected tightly to the second guide rail.

By providing such a fastening bracket, which is arranged in a separate assembly step together with the adjusting mechanism on the first guide rail, the component and material costs of the adjusting device increase, for instance due to the screws to be provided for the connection and the required component processing (conventionally the fastening bracket has to be reworked for instance by rolling over for chipless smoothing and solidifying the material surface). Furthermore, the assembly is complicated due to the comparably complicated connecting process of the fastening bracket to the first guide rail, for instance by screwing or crimping, requiring multiple assembly steps.

SUMMARY

Object of the present invention is it to provide an adjusting device for adjusting two vehicle parts relative to each other, wherein the fastening and support of the adjusting mechanism on the first guide rail can be done with simple, cost efficient and the assembly facilitating means. It is furthermore an object of the invention to provide a method for assembling such an adjusting device, which can be carried out in a simple and cost efficient manner.

According to an exemplary embodiment of the invention, an adjusting device of the previously mentioned kind is provided wherein the fastening device comprises at least two supporting parts formed separate from each other, of which at least one is arranged in front of the adjusting mechanism when viewed in the direction of the longitudinal axis and at least one is arranged behind the adjusting mechanism between the legs on the first guide rail when viewed in direction of the longitudinal axis, wherein the at least two supporting parts each have at least one surface section extending in a plane along the longitudinal axis and are welded to the base and/or to at least one of the legs of the first guide rail.

The present invention is based on the idea to provide supporting parts structurally separated from each other for supporting the adjusting mechanism with respect to the first guide rail, which are not connected to the first guide rail in a comparably elaborate, costly manner, for instance by screwing or crimping, but are arranged between the legs of the guide rail and are welded to the first guide rail. This saves, on the one hand, material costs (for instance no screws for obtaining a screw connection are any longer required) and on the other hand, assembly costs (for instance no screw connections have to be set in separate assembly steps). Furthermore, the supporting parts can be comparably easy manufactured, wherein when using a weld joint for fastening the supporting parts on the first guide rail an in particular tight connection is provided, which can also securely support large load forces and can be at the same time manufactured in a simple, automatable manner.

Since the supporting parts are designed structurally separated from each other the required construction space is also reduced. In particular, a bracket-like connection of the supporting parts encompassing the adjusting mechanism with each other is not provided.

The term "formed separate from each other" has to be understood in this context such that the supporting parts are not directly connected to each other, thus do not form an immediate structural unit. At the same time, the supporting parts are both connected to the assigned guide rail and are fixed indirectly in their position to each other via the guide rail.

The use of supporting parts welded to the first guide rail is advantageously accompanied with a fundamental change in the assembly process of the adjusting device. While conventionally, when using a fastening bracket for connecting the adjusting mechanism to the first guide rail the adjusting mechanism is at first positioned on the fastening bracket in order to be inserted together with the fastening bracket into the first guide rail and to be connected thereto, the now provided supporting parts are advantageously at first welded to the first guide rail in order to position the adjusting mechanism subsequently on the first guide rail. This requires that the supporting parts are constructed such that the adjusting mechanism having the supporting parts welded to the first guide rail can be inserted between the legs of the first guide rail such that the supporting parts have in contrast to conventional fastening brackets a shape which does not close the first guide rail outwards but leaves at least so much space that the adjusting mechanism can be inserted between the legs of the essentially U-shaped first guide rail and the supporting parts positioned thereon.

The supporting parts arranged in front or behind the adjusting mechanism on the first guide rail when viewed along the longitudinal axis each can comprise at least one form lock section for obtaining a preferred connection, which is inserted into an opening of the base and/or of at least one of the legs of the first guide rail for providing a form locking connection of the supporting parts to the first guide rail, which guarantees a support of the supporting parts in particular in case of a force impact along the longitudinal axis and a secure hold of the supporting parts on the first guide rail.

It is possible in this case to provide the weld joint for fastening the supporting parts on the first guide rail directly on a form lock section or multiple form lock sections such that the supporting parts are connected to the first guide rail on the one hand form locked and on the other hand thermally bonded via the form lock sections provided respectively.

Alternatively or additionally, it can also be provided that the supporting parts are each welded with at least one resting section, which rests (not form locked) against the base and/or the legs of the first guide rail, to the first guide rail. The resting of the supporting parts occurs inside of the base and/or the legs of the first guide rail, thus on the side of the first guide rail facing the adjusting mechanism within the interior space defined by the legs and the base, wherein additionally a form locked engagement of the supporting parts can be provided with form lock sections provided respectively, which engage with openings on the first guide rail.

The resting section can differ from the surface section of the at least one supporting part and can be formed for instance by an edge with which the supporting part rests against the first guide rail. The surface section serves in this case for supporting the supporting part on the guide rail and for providing a high resistant moment (moment of inertia of area) without that the surface section of the supporting part is itself welded to the guide rail.

It is also conceivable and of an advantage, if the at least two supporting parts are welded via the surface section to the base and/or to at least one of the legs of the first guide rail.

It can be additionally provided that at least one of the form lock sections of a supporting part reaches through the base of the first guide rail and projects outwards beyond the base of the first guide rail. The form lock section of the supporting part can be used in this manner on the one hand to position and to attach (form locked) the supporting part on the first guide rail. In a double function the form lock section projecting outwards from the guide rail according to the type of a flap can be used as a positioning aid by the means of which the arrangement for instance of a drive or a (for instance flexible) driving shaft on the first guide rail can be elevated. The drive or the driving shaft can be connected to the guide rail in a proper position via the form lock sections projecting outwards, for instance by arranging a suitable carrier between the flap-like form lock sections projecting outwards and by attaching it precisely in the desired position predetermined by the form lock sections to the guide rail in order to be connected to the adjusting mechanism for transferring an adjusting force.

The supporting parts welded to the first guide rail can have in different embodiments different constructions.

In a first exemplary embodiment the supporting parts can comprise for instance a surface section extending flatly, wherein said surface section extends in a plane along the longitudinal axis, wherein the at least two supporting parts rest against the first guide rail with a resting section aligned along the longitudinal axis and support the adjusting mechanism by a supporting section continuing transverse to the longitudinal axis. The supporting parts are thus essentially arranged along the first guide rail and are welded to the first guide rail via the longitudinally extending section, wherein a form lock section for form lock connection to the first guide rail can also simultaneously be provided at this longitudinal section.

The supporting parts extend in this embodiment essentially vertical to the plane of the first guide rail, to which they are connected, and comprise on the edge thereof each facing the adjusting mechanism a supporting section continuing transverse to the longitudinal axis, wherein said supporting section rests against the adjusting mechanism and furthermore supports the adjusting mechanism along the longitudinal axis. The adjusting mechanism is attached by the supporting parts along the longitudinal axis, wherein an additional connection of the adjusting mechanism to the first guide rail is not necessary, since the adjusting mechanism engages via the spindle nut with the spindle arranged torque-proof on the second guide rail and is retained in a position in a direction radial to the spindle by the engagement with the spindle. When operating the adjusting device the adjusting forces are introduced into the first guide rail via the adjusting mechanism and the supporting parts such that a vehicle seat connected to the first guide rail can be adjusted along the longitudinal axis.

In general, it is sufficient if a supporting part is arranged in each case on the guide rail in front and behind the adjusting mechanism when viewed in direction of the longitudinal axis in order to support the adjusting mechanism in both directions along the longitudinal axis on the first guide rail. However, in a preferred, embodiment, a supporting part pair formed by two supporting parts is provided in each case on each side of the adjusting mechanism. Both supporting parts of each supporting part pair are arranged for instance on the base of the first guide rail and project vertical to the base into the interior space of the first guide rail formed between the legs, wherein the supporting parts of each supporting part pair receive the spindle in cross direction there between, thus a supporting part extends on the one side of the spindle and the other supporting part extends on the other side of the spindle.

In an exemplary modification it can also be provided that both supporting parts of each supporting part pair are connected to each other via a connecting section, wherein the connecting section encompasses the spindle on the side thereof facing away from the base of the first guide rail. The supporting part pair that forms a unit by providing the connecting section encloses thus the spindle against the first guide rail. A particular stable arrangement having supporting parts securely retained on the first guide rail is created by providing the connecting section.

It can also be provided alternatively that the connecting section does not encompass the spindle on the side thereof facing away from the base of the first guide rail, but rather provides for instance a connection of the supporting parts on the side of the spindle facing the base of the first guide rail.

In an alternative second embodiment the supporting parts can also comprise in each case a supporting section extending transverse to the longitudinal axis, wherein again when viewed in direction of the longitudinal axis a supporting part is arranged in front of the adjusting mechanism and a supporting part is arranged behind the adjusting mechanism and the supporting parts rest against the adjusting mechanism flatly for support. The supporting parts welded to the first guide rail close thus at least partially the profile of the first guide rail being U-shaped in cross-section in direction of the longitudinal axis and receive the adjusting mechanism there between such that the adjusting mechanism is retained and supported transverse to the longitudinal axis of the first guide rail between the legs of the first guide rail and along the longitudinal axis between the supporting parts. The U-shaped profile is again not closed towards the side facing away from the base of the first guide rail and is thus open on one side such that the adjusting mechanism can be positioned to the first guide rail in case of supporting parts already welded to the first guide rail.

Both supporting parts each comprise advantageously in this case an opening at which the spindle reaches through the supporting parts such that the spindle extends within the internal space defined by the legs and the base of the first guide rail through the supporting parts and engages with the adjusting mechanism arranged between the supporting parts.

The surface section of each supporting part, via which the supporting part can be welded to the first guide rail, is bended towards the supporting section of the supporting part and rests flatly against a leg of the guide rail for an improved resting and for obtaining a weld joint.

The supporting parts each comprise in a modification additionally to the surface section an engagement section, which extends vertical to the supporting section and parallel to the surface section and is enclosed in an opening of the first guide rail. A supporting part being U-shaped in cross section is provided, the base thereof is formed by the supporting section and the legs thereof are formed on the one hand by the surface section (via which the supporting part is welded to the first guide rail) and on the other hand by the engaging section (via which the supporting part is enclosed in an opening of the first guide rail).

The additional engagement section is preferably enclosed with a clearance in the corresponding opening of the first guide rail, wherein the clearance is measured such that the engagement section has in a normal operating condition no supporting function and is loosely enclosed in the corresponding opening of the first guide rail. Only in case of exceptional high loads in case of a crash and a deformation of the guide rail arrangement resulting there from the engaging section is supported by the first guide rail and enforces thus the hold of the adjusting mechanism on the first guide rail.

In an alternative to the additional engaging section the surface section of each supporting part can also be enclosed in an opening of the first guide rail and thus can realize an engaging section of the above-mentioned kind without that the supporting part is connected to the first guide rail via the surface section. The supporting parts are then not welded to the first guide rail via their respective surface section, but rather in each case via a resting section being different from the surface section, wherein said resting section is formed by an edge of the supporting section.

The surface section is preferably enclosed in this case with a clearance in the opening of the first guide rail when viewed along the longitudinal axis, wherein the clearance is measured such that the supporting part with its surface section does not come in contact with the edge of the opening of the first guide rail in a normal operating condition, if the guide rails are loaded by weight forces of a vehicle occupant or by adjusting forces introduced in a normal operation and elastically (slightly) deform (also designated as "rail briefing"). Only in case of exceptionally high loads for instance in a crash case during a front crash or rear crash, during which loading forces act along the longitudinal axis of the guide rails and can lead to a deformation of the guide rail and/or the supporting part, the surface section will rest against the edge of the opening and is supported by the first guide rail.

Since the supporting parts do not rest against the guide rail in a normal operation condition with their engaging section (which is realized by the surface section in the last mentioned embodiment), the acoustic of the adjusting device can be improved in a normal operation of the adjusting device, and tensions and sluggishness in the operation of the adjusting device resulting therefrom can be avoided or can be at least reduced. In a normal operating condition the engaging section does not have a supporting function and is loosely enclosed in the corresponding opening of the first guide rail. Only in case of extraordinary high loads in a case of a crash and a (elastic or plastic) deformation of the guide rail arrangement resulting therefrom the engaging section is supported by the guide rails and enforces thus the hold of the adjusting mechanism to the first guide rail.

Such an adjusting device, which solves also the object of the present invention by using a supporting part loosely enclosed on one side, can thereby comprise the following features:

a first guide rail longitudinally extending along a longitudinal axis which is formed by a base and lateral legs connected to the base,
  a second guide rail movably arranged on the first guide rail and longitudinally extending along the longitudinal axis,
  an adjusting mechanism arranged between the legs on the first guide rail, wherein said adjusting mechanisms comprises a spindle nut, which can be set into a rotation about the longitudinal axis for driving the adjusting device,
  a spindle torque-proof arranged on the second guide rail and longitudinally extending along the longitudinal axis, which engages with the spindle nut such that during a rotation of the spindle nut the first guide rail is moved along the longitudinal relative to the second guide rail, and
  a fastening device for fastening the adjusting mechanism to the first guide rail,
wherein the fastening device comprises two supporting parts, of which at least one is arranged in front of the adjusting mechanism when viewed in the direction of the longitudinal axis and at least one is arranged behind the adjusting mechanism between the legs on the first guide rail when viewed in direction of the longitudinal axis, wherein the two supporting parts each comprise
  a resting section with which the supporting part rests against the base or at least one of the legs of the first guide rail and with which the supporting part is welded to the first guide rail, and
  an engaging section, which is enclosed in an opening of a second of the legs of the first guide rail with the clearance such that the engaging section does not rest against the leg of first guide rail in a normal operating condition of the adjusting device, but rather comes in contact with the leg (101) of the first guide rail only during a deformation of the first guide rail and/or the supporting part due to a crash case.

The object is further solved by a method for assembling an adjusting device with the following steps:
  fastening the at least two supporting parts to the first guide rail by welding,
  inserting the adjusting mechanism between the legs of the first guide rail and
  arranging the second guide rail on the first guide rail.

Due to the use of supporting parts welded to the first guide rail a new method for assembling of such an adjusting device is provided, in which in contrast to the until now conventional assembly methods the supporting parts are attached at first to the first guide rail by welding before the adjusting mechanism is positioned on the first guide rail. In contrast to the previously common assembly method (during which at first an adjusting mechanism is positioned on a fastening bracket and the fastening bracket is then attached together with the adjusting mechanism to the first guide rail) the attaching of the supporting parts and of the adjusting mechanism to the first guide rail occurs thus in separate assembly steps: at first, the supporting parts are welded to the first guide rail, then the adjusting mechanism is positioned on the first guide rail, wherein the adjusting mechanism rests between the supporting parts which are offset when viewed in direction of the longitudinal axis of the guide rail, and only subsequently the second guide rail is positioned on the first guide rail.

In order to attach the at least two supporting parts on the first guide rail the following measures can be taken.

At first, the supporting parts are arranged with at least one form lock section on a respective opening of the first guide rail and are tensed by suitable tensioning means in direction of the longitudinal axis. The tensioning occurs thereby advantageously such that the supporting parts (which are shifted in direction of the longitudinal axis for receiving the adjusting mechanism there between) are pressed towards one another and thus have a defined distance there between. Hereby, the opening degree for the adjusting mechanism is adjusted, which is to be arranged between the supporting parts on the first guide rail.

Additionally, the supporting parts will rest with at least one resting section against the first guide rail and will be tensed by suitable tensioning means relative to the first guide rail.

The tensioning means, for instance provided by an assembly tool, can act in three spatial directions, namely, along the longitudinal axis and in two spatial directions transverse to the longitudinal axis, corresponding to the X, Y and Z direction in a vehicle in case of an adjusting device assembled as intended. For instance, the supporting parts can be pressed via an upper resting section in Z-direction against the base of the first guide rail and can be tensed simultaneously with a surface section extending flatly along the longitudinal axis in Y-direction against a leg of the first guide rail, wherein the supporting parts are pressed simultaneously towards each other in X-direction (corresponding to the direction of the longitudinal axis) and are thus tensed against each other.

Due to the tensioning the supporting parts are arranged in a precise position on the first guide rail and can be subsequently welded with the at least one surface section to the first guide rail.

The supporting parts can be connected to the first guide rail, for instance by laser welding or inert gas welding (preferably MAG welding).

If the connection is carried out by the means of laser welding, then a fillet weld can be placed in the internal space of the guide rail, or it can be welded through the leg of the guide rail in order to connect the surface section to the leg.

If the welding is carried out by the means of inert gas welding then for instance a hole pattern with suitable openings can be provided in the leg of the first guide rail, to which the supporting part is to be connected, wherein said openings are filled with additional material by the means of inert gas welding in order to thereby connect the supporting part to the first guide rail.

If the supporting parts are connected to the first guide rail, the adjusting mechanism is inserted between the legs of the first guide rail, wherein the adjusting mechanism can be inserted between the supporting parts by press fit or form fit and can thus be retained between the supporting parts on the first guide rail.

If the supporting parts allow inserting the spindle from the side facing away from the base of the first guide rail transverse to the longitudinal axis (thus the spindle does not have to be passed through the openings on the supporting parts), the spindle can be arranged on the adjusting mechanism before inserting the adjusting mechanism into the first guide rail and the adjusting mechanism can be positioned together with the spindle on the first guide rail. At first, the spindle is brought into engagement with the adjusting mechanism, the obtained component assembly of adjusting mechanism and spindle is positioned on the first guide rail, the second guide rail is slid onto the first guide rail, and subsequently the spindle is connected torque-proof to the second guide rail for instance with a suitable spindle fastening bracket.

If the spindle has to be passed through openings on the supporting parts in direction of the longitudinal axis a common positioning of adjusting mechanism and spindle on the first guide rail is not possible, if the supporting parts are already welded to the first guide rail. Therefore, the spindle is only positioned in this case on the adjusting mechanism after the adjusting mechanism has already been positioned between the legs of the first guide rail. For this purpose, the spindle is passed through the openings on the supporting parts and is brought into engagement with the adjusting mechanism by driving for instance the adjusting mechanism with the spindle nut arranged thereon and setting it into a rotational movement in order to pull the spindle into the adjusting mechanism.

The spindle can be brought into engagement with the adjusting mechanism before or after sliding the second guide rail on the first guide rail. If the spindle is attached to the first guide rail only after positioning the second guide rail, the second guide rail can be brought for this purpose into a final position moved relative to the first guide rail in order to be able to position the spindle on the adjusting mechanism in a simple manner. If the spindle engages with the adjusting mechanism in a desired position, the second guide rail is moved back and the spindle is positioned on the second guide rail using suitable spindle fastening brackets.

BRIEF DESCRIPTION OF THE DRAWINGS

The basic idea of the invention shall be explained in more detail in the following by the means of the embodiments illustrated in the Figures.

FIG. 1 shows a perspective view of a first embodiment of an adjusting device diagonal from the front.

FIG. 2 shows a front view of the adjusting device without lower guide rail.

FIG. 3 shows a side view of the adjusting device without lower guide rail and partially cut open.

FIG. 15 shows a schematic view of a method for assembling an adjusting device.

FIG. 16 shows a schematic view of a modified assembly method.

FIG. 17 shows a perspective view of a further embodiment of an adjusting device illustrating a guide rail with supporting parts arranged thereon.

DETAILED DESCRIPTION

Figure 4:
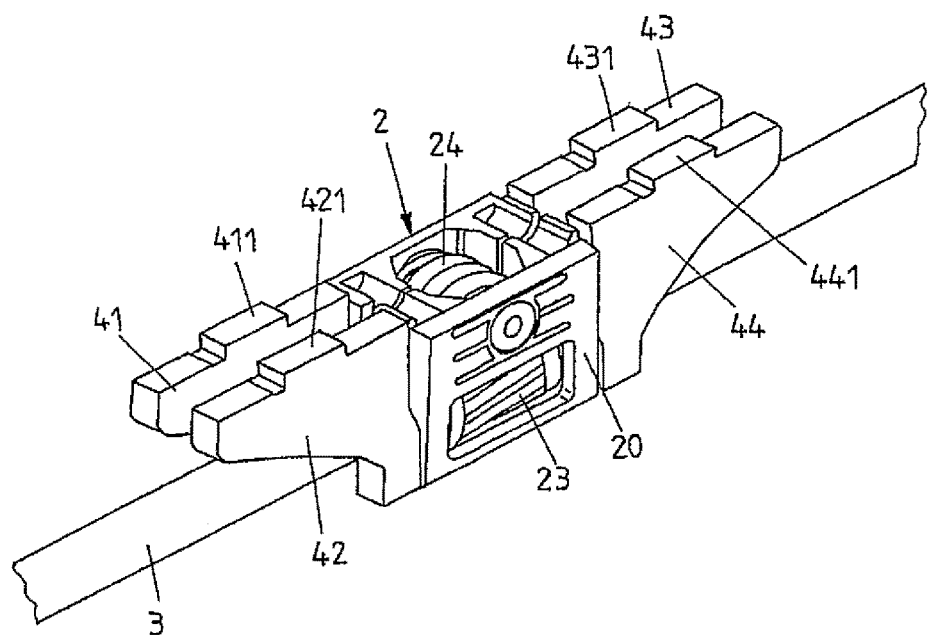
FIG. 4 shows a perspective view of the adjusting mechanism, the spindle arranged thereon and the supporting parts of the adjusting device supporting the adjusting mechanism.
Figure 5:
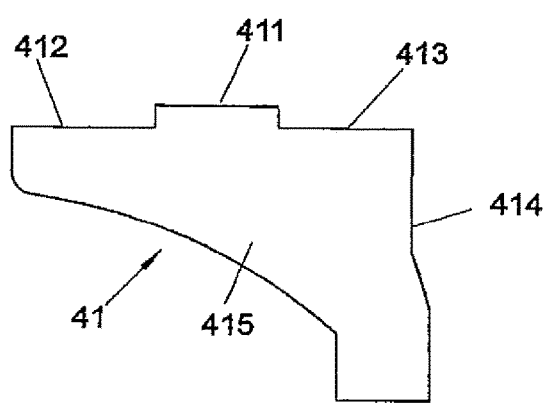
FIG. 5 shows a schematic side view of a modified embodiment of a supporting part.

FIGS. 1 to 5 show in different views a first embodiment of an adjusting device in which a guide rail pair 1 consisting of a first guide rail in form of an upper first guide rail 10 and a second guide rail in form of a lower second guide rail 11 is provided in order to connect a vehicle seat to a vehicle floor. The guide rail pair 1 is part of a longitudinal seat adjusting device, which allows a user to adapt the position of the vehicle seat in longitudinal vehicle direction. The first guide rail 10 is hereby connected to the vehicle seat and the second guide rail 11 is connected to the vehicle floor.

In order to adjust the longitudinal seat position the first guide rail 10 can be moved relative to the second guide rail 11 along a longitudinal axis L. The first guide rail 10 is for this purpose slidingly guided at the second guide rail 11, wherein ball bearings can be provided between the first guide rail 10 and the second guide rail 11 for a frictionless mounting in a suitable and known manner. The first guide rail 10, which has a profile essentially U-shaped in the cross section transverse to the longitudinal axis L with an upper base 100 and lateral legs 101, 102, is for this purpose guided on the second guide rail 11 via edge sections 103, 104, which are encompassed by edge sections 113, 114 of the second guide rail 11 formed of a lower base 110 and lateral legs 111, 112.

The movement of the first and second guide rail 10, 11 relative to each other occurs electromotively driven by a spindle gear. For this purpose an adjusting mechanism 2 is arranged on the first guide rail 10, wherein said adjusting mechanism engages with a spindle 3 arranged torque-proof on the second guide rail 11 via a spindle nut 23 (see FIG. 3 and FIG. 4). When operating the adjusting device the spindle nut 23 is driven by driving worm 24 engaging with an external thread of the spindle nut 23, rolls along the spindle 3—caused by the engagement of the spindle nut 23 with an external thread 31 of the spindle via an internal thread 230—and is thus adjusted along the spindle 3.

The spindle nut 23 is arranged within a housing 20 of the adjusting mechanism 2 and is mounted via bearing elements 21, 22 on the housing 20. The driving worm 24, which extends transverse to the longitudinal axis L, is also mounted rotatable in the housing 20 and can be set into a rotational movement driven in a known manner by an electro-engine when operating the adjusting device.

The adjusting device 2 is supported in case of the embodiment illustrated in FIGS. 1 to 5 by four supporting parts 41, 42, 43, 44 extending essentially in a plane along the longitudinal axis L relative to the first guide rail 10. The supporting parts 41, 42, 43, 44 are arranged on the base 100 on the side thereof facing the adjusting mechanism 2 and extend from the base 100 to an internal space I defined by the base 100 and the lateral legs 101, 102 of the first guide rail 10.

As apparent from FIG. 3 and FIG. 4 when viewed in direction of the longitudinal axis L two supporting parts 41, 42 are arranged in front of the adjusting mechanism 2 and two supporting parts 43, 44 are arranged behind the adjusting mechanism 2, respectively. The supporting parts 41, 42, 43, 44 each have an almost triangular shape, wherein they rest against the base 100 of the first guide rail 10 with upper resting sections 412, 413 and against the housing 20 of the adjusting mechanism 2 with vertical supporting sections 414 (see FIG. 5).

In addition, projecting form lock sections 411, 421, 431, 441 are provided on the upper edge of each supporting part 41, 42, 43, 44 forming the upper resting sections 412, 413, which extend through openings 141, 142, 143, 144 (illustrated in the partially sectioned view according to FIG. 3 and schematically in FIGS. 15 and 16) on the base 100 of the first guide rail 110 and which fix the supporting parts 41, 42, 43, 44 form locking in direction of the longitudinal axis L on the first guide rail 10.

In addition, the supporting parts 41, 42, 43, 44 are welded to the edge of the opening 141, 142, 143, 144 on the base 100 of the first guide rail 10 via a welding seam each annular surrounding the form lock sections 411, 421, 431, 441, wherein alternatively or additionally on the inside of the base 100 also welding seams can be provided on the resting sections 412, 413.

As apparent from FIG. 1 and FIG. 2, the supporting parts 41, 42, 43, 44 project starting from the base 100 into the internal space I of the first guide rail 10 and receive thereby pairwise the adjusting mechanism 2 there between (see also FIG. 4). Furthermore, the spindle 3 is coming to rest between two supporting parts 41, 42 or 43, 44, respectively, and extends there through, wherein of each supporting part pair a supporting part 41, 43 comes to a rest in front or behind the adjusting mechanism 2 (when viewed in direction with the longitudinal axis L) on the side of the one leg 102 and the other supporting part 42, 44 on the side of the other leg 101 (see FIG. 2)

The adjusting mechanism 2 is supported by the supporting parts 41, 42, 43, 44 on the first guide rail 10 and engages simultaneously with the spindle 3 arranged torque-proof on the second guide rail 11 via the spindle nut 23. A further fixing of the adjusting mechanism 2 on the first guide rail 10 is not intended and also not required, since the adjusting mechanism 2 is sufficiently fixed relative to the first guide rail 10 by the supporting parts 41, 42, 43, 44 and the engagement with the spindle 3.

When operating the adjusting device, the adjusting mechanism 2 moves in an electromotive driven manner by rolling the spindle nut 23 on the spindle 3 along the spindle 3 and exerts thereby depending on the respective adjusting direction an adjusting force on the supporting parts 41, 42 arranged on the one side of the adjusting mechanism 2 or on the supporting parts 43, 44 arranged on the other side of the adjusting mechanism 2, wherein the respective loaded supporting parts 41, 42 or 43, 44 discharge the adjusting force into the first guide rail 10 and cause thereby an adjusting of the first guide rail 10 in the respective adjusting direction.

Since the supporting parts 41, 42, 43, 44 extend with surface section 415 along a plane parallel to the longitudinal axis L of the spindle 3, the supporting parts 41, 42, 43, 44 can support the adjusting mechanism 2 in a preferred manner along the longitudinal axis L on the first guide rail 10. Since the supporting parts 41, 42, 43, 44 are welded to the first guide rail 10 and furthermore rest against the openings 141, 142, 143, 144 of the first guide rail 10 in a form locked manner via a form lock section 411, 421, 431, 441, respectively, the supporting parts 41, 42, 43, 44 are tightly connected to the first guide rail 10 in a simple construction.

In contrast to the conventionally used fastening brackets, the supporting parts 41, 42, 43, 44 do not use screw connections for fastening on the first guide rail 10. Furthermore, the supporting parts 41, 42, 43, 44 are designed such that the adjusting mechanism 2 can be inserted from below, thus from the side of the first guide rail 10 facing away from the base 100, into the internal space I of the first guide rail 10 with supporting parts 41, 42, 43, 44 already fastened to the guide rail 10. The supporting parts 41, 42, 43, 44 can thus be welded to the first guide rail 10 independently on the adjusting mechanism 2 and already before welding the adjusting mechanism 2.

The supporting parts 41, 42, 43, 44 can be manufactured simply and cost-efficient. Since furthermore no additional components for screw connections are necessary, the material costs are further reduced and also the assembly is simplified, since assembly steps for obtaining screw connections are not required.

Preferred assembly methods for assembling the adjusting device shall be explained later in conjunction to FIGS. 15 and 16.

Figure 6:
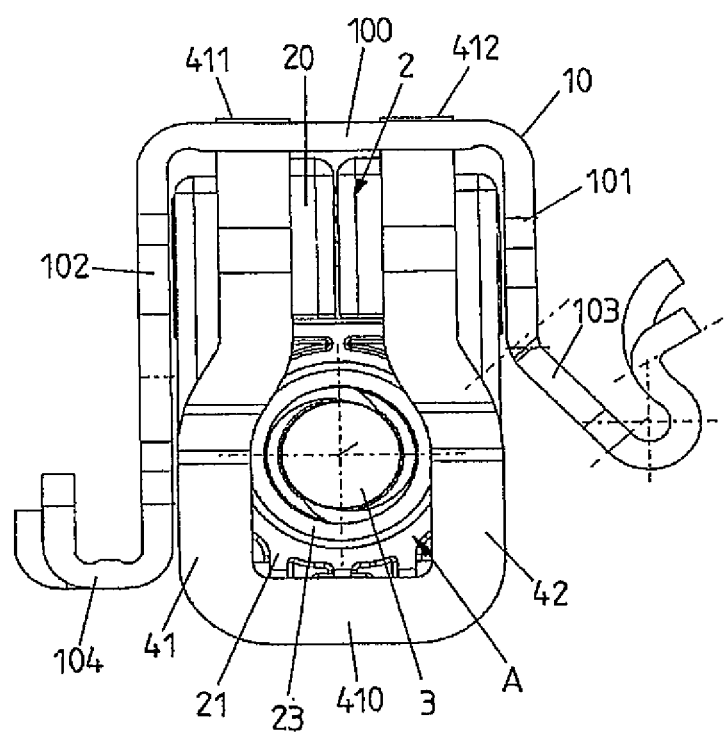
FIG. 6 shows a front view of an adjusting device in which supporting parts arranged on one side of the adjusting mechanism are connected with each other via a connecting section encompassing the spindle.
Figure 7:
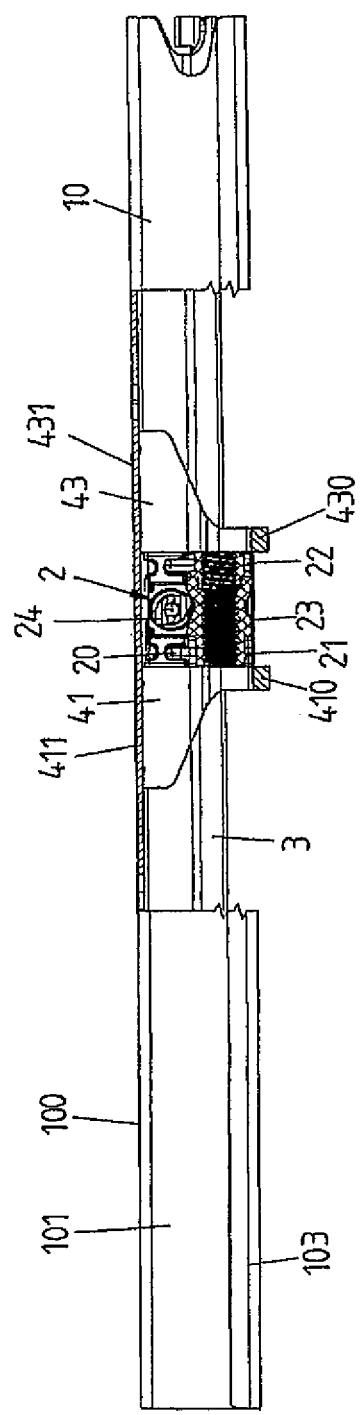
FIG. 7 shows a partially sectional side view of the adjusting device according to FIG. 6.

In case of a modified embodiment of the supporting parts 41, 42 according to FIGS. 6 and 7, the supporting parts 41, 42 are connected to each other via a connecting section 410 such that a supporting part pair within integrally connected supporting parts 41, 42 is provided. The connecting section 410 encompasses thereby the spindle 3 on its side facing away from the base 100 of the first guide rail 10 such that the supporting parts 41, 42 together with the connecting section 410 encompasses the spindle 3 relative to the first guide rail 10 and the spindle 3 is passed through the supporting parts 41, 42. A particular solid supporting part pair is obtained, which simplifies the assembly further, since the integral supporting parts 41, 42 can be positioned together in one assembly step on the first guide rail 10 and can be welded therewith. The same is valid for the supporting parts 43, 44 arranged on the other side of the adjusting mechanism 2 (see FIG. 7).

Figure 8:
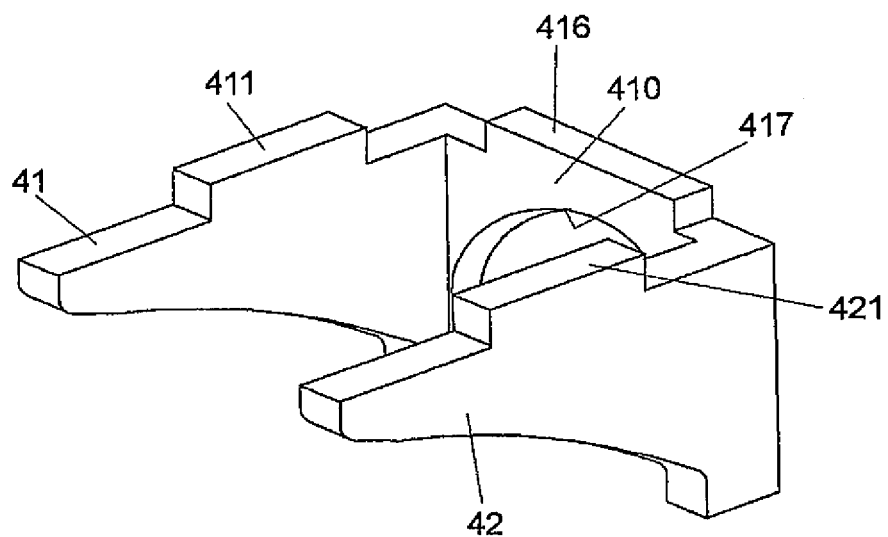
FIG. 8 shows a modified embodiment of two supporting parts connected to each other.
Figure 9:
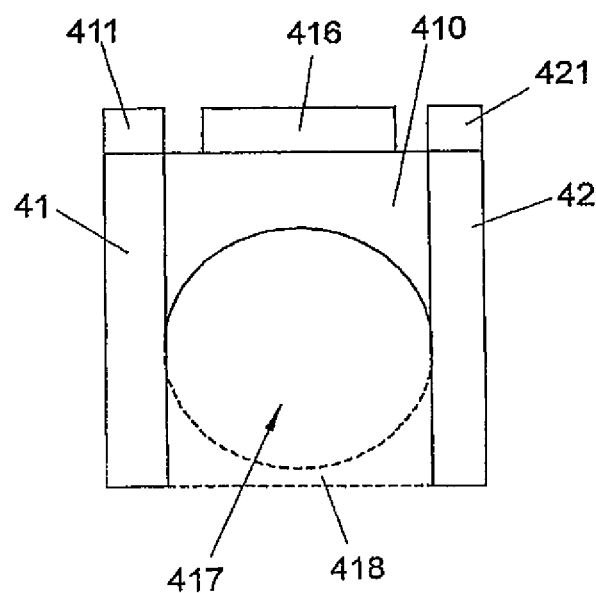
FIG. 9 shows a front view of the arrangement according to FIG. 8.

In case of a further embodiment illustrated in FIGS. 8 and 9 of an integral supporting part pair system consisting of supporting parts 41, 42 the supporting parts 41, 42 are connected to each other on the side of the supporting parts 41, 42 facing the adjusting mechanism 2 via a transverse extending connecting section 410. An opening 417 is formed in the connecting section 410 for passing through the spindle 3, wherein the opening 410 can be closed downwards by an arch section 418 (illustrated by a dashed line in FIG. 9) or can also be open downwards (such that the spindle 3 can be positioned from below on the supporting part 41, 42).

Figure 10:
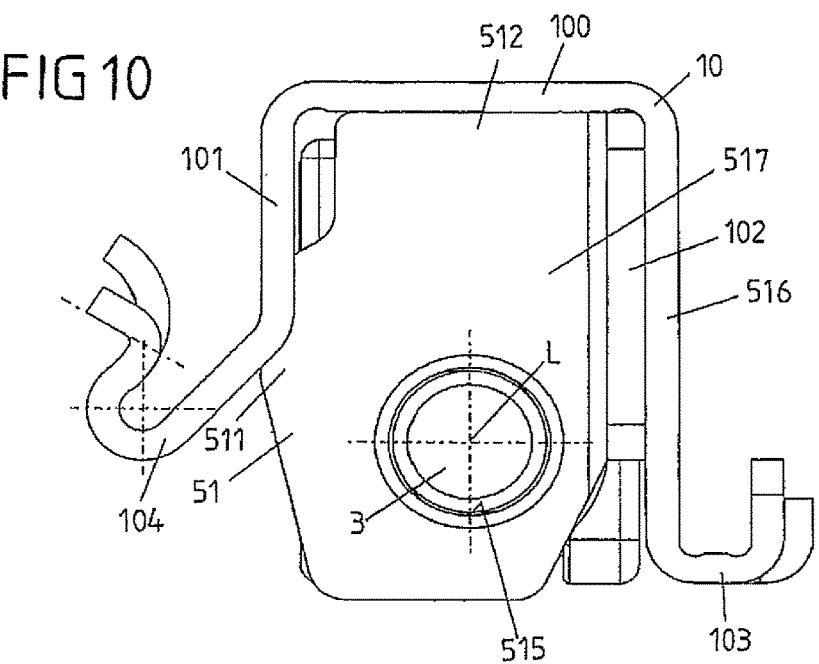
FIG. 10 shows a front view of a further embodiment of an adjusting device.
Figure 11:
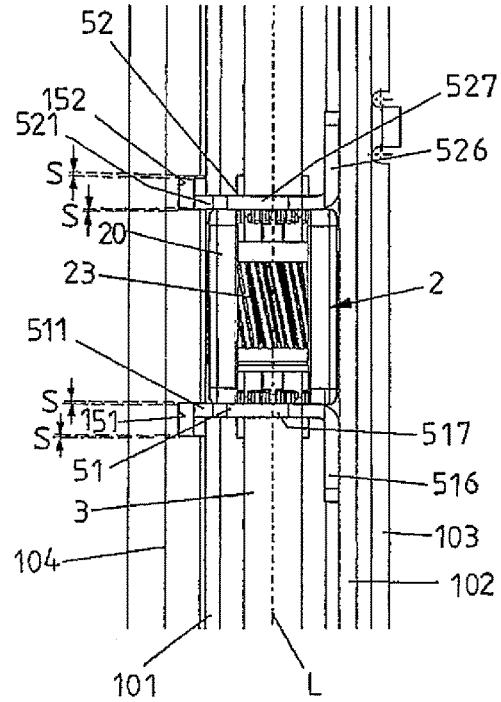
FIG. 11 shows a cut-out top view of the adjusting device according to FIG. 10.
Figure 12:
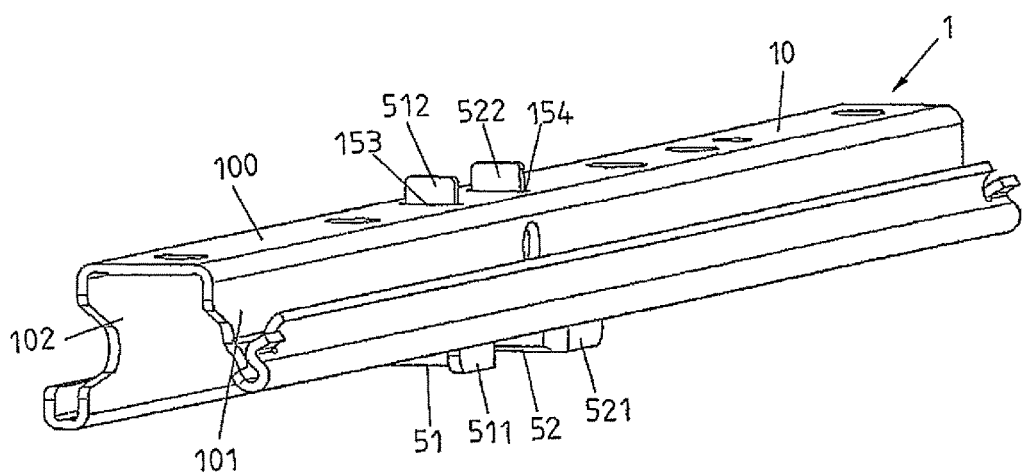
FIG. 12 shows a perspective view of a modified embodiment of an adjusting device.

FIGS. 10 and 11 show a further embodiment of an adjusting device, which is essentially functionally identical to the previously described adjusting device and wherein components of the same function are provided with the same reference signs, as far as convenient.

In contrast to the previously described adjusting device a respective supporting part 51, 52 is arranged in case of the embodiment according to FIGS. 10 and 11 when viewed in direction of the longitudinal axis L in front and behind the adjusting mechanism 2, which extends in a plane transverse to the longitudinal axis L and closes the U-shaped profile of the upper first guide rail 10 almost completely in a plane transverse to the longitudinal axis L. Both supporting parts 51, 52 are thereby arranged in a shifted manner to each other in direction of the longitudinal axis L and receive the adjusting mechanism 2 there between.

The supporting parts 51, 52 are in each case formed flatly with a supporting section 517, 527 extending transverse to the longitudinal axis L, wherein the adjusting mechanism 2 rests against said supporting section.

The supporting parts 51, 52 comprise furthermore in each case a surface section 516, 526 extending in an angle to the supporting section 517, 527, with which the supporting parts 51, 52 rest in each case flatly against the leg 102 of the first guide rail 10 and via which the supporting parts 51, 52 are in each case welded to the leg 102. By providing such a surface section 516, 526, a secure, tight attachment of the supporting parts 51, 52 to the first guide rail is guaranteed and allows the mounting of a flatly welded joint (for instance via an O- or S-shaped welding seam) for an optimal force transmission into the first guide rail 10. Furthermore, by providing the surface section 516, 526, a high resistant moment (moment of inertia of area) of the supporting parts 51, 52 is guaranteed.

Since the surface section 516, 526 rests against the leg 102 of the first guide rail 10 and the welded joint of a supporting part 51, 52 to the first guide rail is obtained via the surface section 516, 526 an overlapping connection (overlapping joint) is provided, which has a high stability by good support. The transverse extending supporting parts 51, 52 provide a reception for the adjusting mechanism 2, by which the adjusting mechanism 2 is supported relative to the first guide rail 10 and is retained at the first guide rail 10 and into which the adjusting mechanism 2 can be inserted from below, thus from the side of the first guide rail 10 facing away from the base 100. The supporting parts 51, 52 can again be made or manufactured as simple metal parts in a cost-efficient manner without expensive processing.

An opening 515 is formed in the supporting parts 51, 52, respectively, through which the spindle 3 extends towards the adjusting mechanism 2.

In addition, an engaging section 511, 521 is provided on each of the supporting parts 51, 52, wherein said engaging section is enclosed in an opening 151, 152 in form of a recess on the leg 101 of the first guide rail 10. These engaging sections 511, 521 serve for supporting the supporting parts 51, 52 in a case of a crash and each is enclosed for this purpose with a clearance S in the assigned opening 151, 152 of the leg 101 such that in a normal operation, thus under normal global forces acting and operating the adjusting device (adjusting forces and belt forces of a vehicle occupant), each does not rest against the edge of the opening 151, 152 and thus is not in contact with the leg 101. Only in a case of a crash and a (plastic or elastic) deformation of the first guide rail 10 resulting there from or of the supporting part 51, 52 just loaded during the crash (depending on the direction of action of the crash), the engaging section 511, 521 comes to rest against the leg 101 of the first guide rail 10 and provides thus an additional support for the adjusting mechanism 2 at the first guide rail 10 such that the adjusting mechanism 2 is securely retained on the first guide rail 3 also in case of a crash and the large crash forces acting thereby.

Since the engaging sections 511, 521 do not rest against the leg 101 of the first guide rail 10 in a normal operation, an undesired noise formation due to a (elastic) deformation of the first guide rail 10 under normal operation, for instance if a vehicle occupant sits down on the vehicle seat, is avoided.

The openings 151, 152 on the leg 101 of the first guide rail 10 (see FIG. 10) can be opened downwards, thus in direction away from the base 100 such that the supporting parts 51, 52 can be inserted from below into the first guide rail 10 and can be inserted into the corresponding openings 151. In this manner, the supporting parts 151, 152 are arranged on the first guide rail and are fixed subsequently to the first guide rail 10 by welding such that the supporting parts 51, 52 are securely retained on the first guide rail 10.

In case of an embodiment modified in comparison to the embodiment according to FIGS. 10 and 11 and illustrated in FIGS. 12 to 14A, B the supporting parts 51, 52 comprise additionally to their surface section 510, 526, with which they are welded to the leg 102 of the first guide rail 10, an engaging section 511, 521, respectively, which extends flatly in a plane along the longitudinal axis L from the supporting section 517, 527. The supporting parts 51, 52 comprise thus on the one hand a surface section 516, 526 and on the other hand an engaging section 511, 521 on the supporting section 517, 527, respectively, such that an essentially U-shaped arrangement of the supporting parts 51, 52 is provided, wherein the base is formed by the supporting section 517, 527 and the legs of the U-shape are formed on the one hand by the surface section 516, 526 and on the other hand by the engaging section 511, 521.

Figure 13:
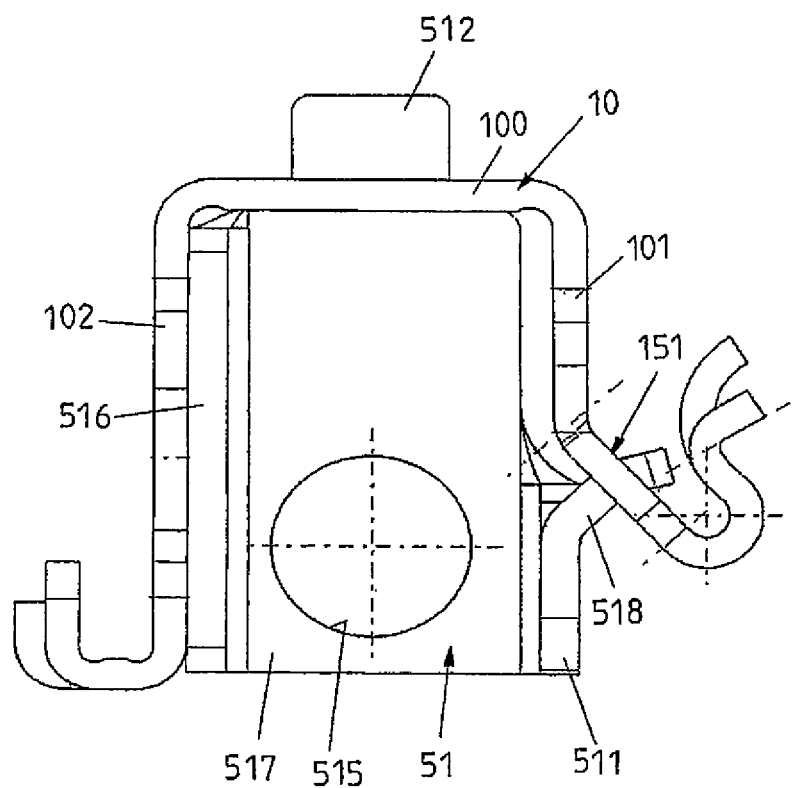
FIG. 13 shows a front view of the adjusting device according to FIG. 12.

The engaging sections 511, 521 are each enclosed in an opening 151, 152 at the leg 101 of the first guide rail 10, wherein a flap 518, 528 is arranged on the engaging section 511, 521, respectively, wherein said flap reaches through the opening 151, 152 on the leg 101 of the first guide rail 10 (see FIG. 13).

In the embodiment according to FIGS. 12 to 14A, B (and also in the previously described embodiments according to FIGS. 10 and 11) each engaging section 511, 521 is enclosed with a clearance S by the assigned opening 151, 152 of the first guide rail 10, wherein the clearance S is measured such that the engaging section 511, 521 does not get to rest against the edge of the respectively assigned opening 151, 152 under normal stress when operating the adjusting device and comes only in contact to the edge of the assigned opening 151, 152 in a case of a crash and the crash forces realized thereby and a deformation of the first guide rail 10 and/or of the just loaded supporting part 51, 52 resulting therefrom. Under normal operating conditions the engaging section 511, 521 is thus loosely enclosed by the assigned opening of the leg 101 in order to get into a rest only in case of a crash in a supporting manner against the guide rail 10.

By arranging the engaging sections 511, 521 with a clearance S in the assigned openings 151, 152 the acoustics of the adjusting device can be improved during operation, and tensions, which could lead to sluggishness during operation, can be avoided or at least reduced.

In the embodiment according to FIGS. 12 to 14A, B upper form lock sections 512, 522 are additionally provided on the supporting parts 51, 52, which reach trough the base 100 of the first guide rail 10 according to the type of flaps at the openings 153, 154 and project upwards, thus outwards beyond the base 100. The form lock sections 512, 522 serve on the one hand for the form locking fixing of the supporting parts 51, 52 on the first guide rail 10 and on the other hand serve in a double function as positioning aid for instance for arranging a drive or a flexible driving shaft on the first guide rail 10. For this purpose, for instance a carrier, via which the drive or the driving shaft is to be connected to the first guide rail 10, is arranged between the form lock sections 512, 522 and thus positioned in a simple, exact manner on the first guide rail 10 such that a driving shaft can be brought into engagement with the adjusting mechanism 2 in a precise manner.

Figure 14A:
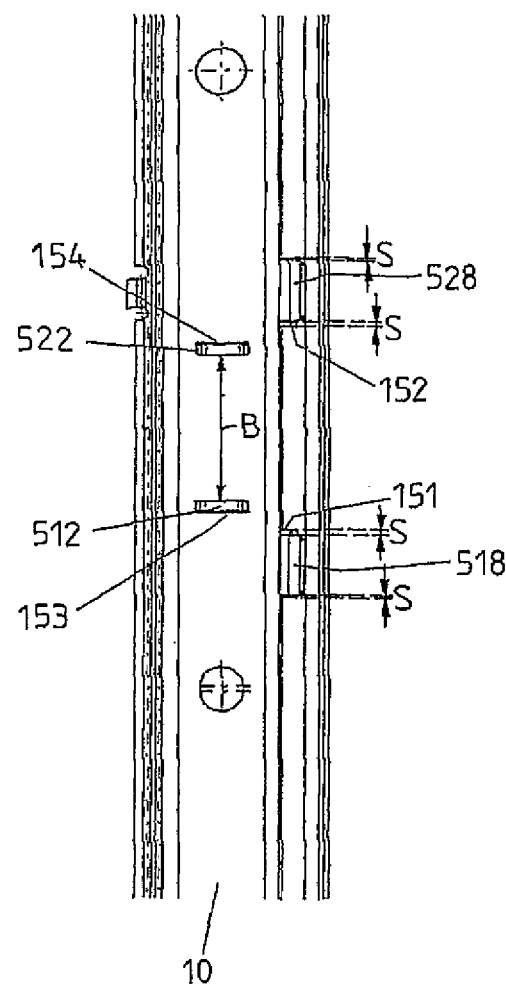
FIG. 14A shows a top view of the adjusting device according to FIG. 12.
Figure 14B:
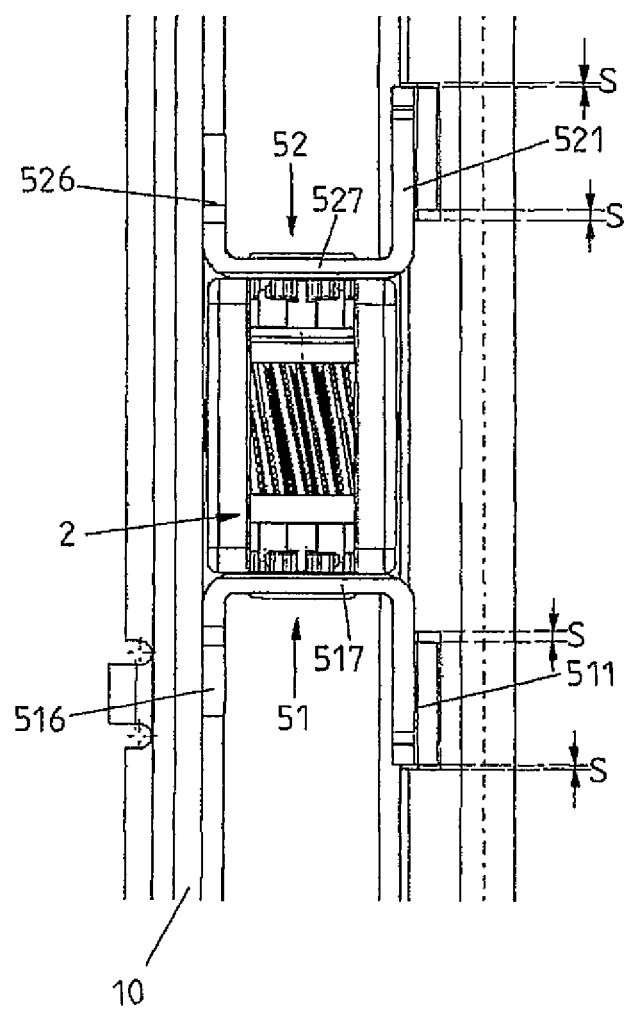
FIG. 14B shows a sectional view of the adjusting device according to FIG. 12.

As apparent from the top view according to FIG. 14A the supporting parts 51, 52 are arranged on the first guide rail 10 such that the tolerance in the position of the supporting parts 51, 52 towards each other is minimized. For this purpose, the supporting parts 51, 52 are tensed against each other by a suitable assembly tool for assembling such that they are pressed onto each other along the longitudinal axis L such that they rest against the respective edge section of the opening 153, 154 pointing towards the other supporting part 51, 52 on the base 100 of the first guide rail 10 and thus the distance B between the supporting parts 51, 52 is adjusted in a defined manner.

The distance B between the supporting parts 51, 52 describes the opening degree between the supporting parts 51, 52 between which the adjusting mechanism 2 is inserted.

Figure 18A:
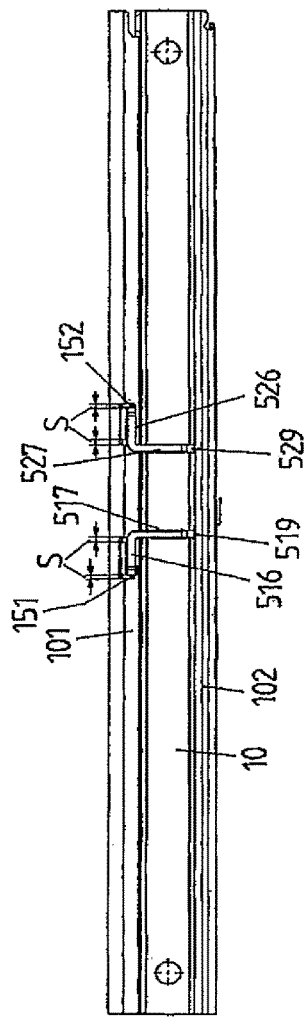
FIG. 18A shows a view of the guide rail and the supporting parts according to FIG. 17 from below.
Figure 18B:
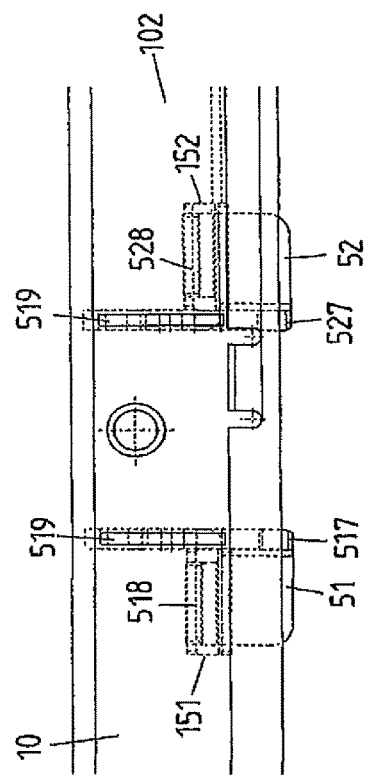
FIG. 18B shows a side view of the guide rail and the supporting parts according to FIG. 17.

In a further embodiment modified in respect to the embodiments according to FIGS. 11 and 12 and FIGS. 12 to 14 illustrated in FIGS. 17 and 18A and 18B, supporting parts 51, 52 are arranged on the upper, first guide rail 10 with supporting parts 517, 527 extending transverse to the longitudinal axis L. The supporting parts 51, 52 each rest thereby against the leg 102 of the first guide rail 10 with a resting section 519, 529 realized by an edge of the supporting section 517, 527 and are welded with this resting section 519, 529 to this leg 102 of the first guide rail 10.

Furthermore, a surface section 516, 526 is formed on the supporting section 517, 527, respectively, wherein said surface section extends in a plane parallel to the longitudinal axis L an forms in this case an engaging section, which is enclosed by an opening 151, 152 at the leg 101 of the guide rail 10 and is thereby distanced with a clearance S (see FIG. 18A) to the edge of the recess 151, 152. The surface sections 516, 526 each comprise for this purpose a flap 518, 528, which, as illustrated in analogy in FIG. 13, each reaches through the assigned recess 151, 152 at the leg 101 with clearance S. In analogy as previously described the clearance S is thereby measured such that the surface section 516, 526 realizing the engaging section of each supporting part 51, 52 does not rest against the leg 101 of the guide rail 10 under normal operating conditions, but only gets to rest against the leg 101 of the first guide rail 10 under exceptionally high loads in case of a crash and a deformation of the guide rail 10 or of the supporting part 51, 52 accompanied therewith.

In the embodiment according to FIGS. 17 and 18A, 18B the supporting parts 51, 52 each are connected exclusively with a lateral edge section in form of the resting section 519, 529 to the guide rail 10, namely the leg 102 of the guide rail 10. The resting section 519, 529 can be hereby attached bluntly on the inside of the leg 102 and can be welded from the inside for instance with a fillet weld or from the outside by the means of welding through to the leg 102.

In this context, it is also conceivable that the supporting parts 51, 52 engage form locking with their resting section 519, 529 each in an assigned recess on the leg 102 and are welded via this form lock to the leg 102.

The supporting section 517, 527 of each supporting part 51, 52 extends transverse to the longitudinal axis L and essentially fills the U-shaped guide rail 10, wherein a spindle 3 (see for instance FIG. 11) enters the supporting sections 517, 527 at the openings 515, 525. The supporting parts 51, 52 are only tightly connected to the first guide rail 10 with their resting section 519, 529, but for instance not with the upper edge section thereof facing the base 100 of the guide rail 10 and also not with the surface sections 516, 526 thereof, which are only enclosed loosely by the openings 151, 152 of the leg 101 of the first guide rail 10.

Although in the previously described embodiments similar supporting parts 41, 42, 43, 44 or 51, 52 are combined with each other, it is also possible and conceivable to combine the different forms of supporting parts 41, 42, 43, 44 or 51, 52. Thus, it is possible to provide on one side of the adjusting mechanism 2 two longitudinally extending supporting parts 41, 42, while on the other opposing side of the adjusting mechanism 2 a transversely extending supporting part 52 is arranged.

By providing the supporting parts 41, 42, 43, 44 or 51, 52 the deformation behaviour during a load caused by a crash can be adjusted and adapted in a specific manner. The background is that during occurrence of crash-related loads in one direction a preferably rigid behaviour of the adjusting device is desired (usually during a front crash), whereas during a load in an opposing direction caused by a crash with force acting in the opposing direction a (certain) deformation is desired in order to dampen the force action on a seat occupant (usually during a rear crash for avoiding a whip lash). In particular, the supporting parts 41, 42, 43, 44 can be specifically adapted such that during a load, in particular caused by a crash, a specific deformation can occur and thus load forces can be absorbed by the deformation.

Since the supporting parts 41, 42, 43, 44 or 51, 52 are welded to the first guide rail 10, the assembly method used for the adjusting device changes appropriately.

The assembly of a adjusting device of this kind occurs conventionally by positioning at first in a first component group an adjusting mechanism, a spindle and a holding device in form of a fastening bracket, and in a second component group the guides rail of the guide rail pair are assembled sliding on each other. The first component group is then inserted into the second component group, thus the guide rail pair, in order to attach the fastening bracket to the first guide rail and the spindle to the second guide rail via corresponding spindle fastening brackets.

If the supporting parts 41, 42, 43, 44 or 51, 52 are welded to the first guide rail 10 in the meaning of the present invention, the connection of these supporting parts 41, 42, 43, 44 or 51, 52 to the first guide rail 10 occurs preferably before the adjusting mechanism 2 is positioned on the first guide rail 10, as this is schematically illustrated for a first assembly method in FIG. 15.

In a first assembly step the supporting parts 41, 42, 43, 44 (illustrated exemplarily as longitudinally extending supporting parts in FIG. 15) are inserted into the first guide rail 10 and are then connected thereto by welding.

Positioning and welding of the supporting parts 41, 42, 43, 44 or 51, 52 occurs thereby preferably with pretension, wherein the supporting parts 41, 42, 43, 44 or 51, 52 are tensed in three spatial directions (accordingly to the X-direction directed along the longitudinally axis L, the Y-direction, and the Z-direction during assembly as intended in a vehicle) against each other and/or relative to the first guide rail 10 by a suitable tool means.

When using longitudinally extending supporting parts 41, 42, 43, 44 (see embodiments according to FIGS. 1-9) the supporting parts 41, 42, 43, 44 are pressed onto each other in pairs in X-direction (along the longitudinal axis L) and in Y-direction (horizontal direction transverse to the longitudinal axis L) and are thus tensed against each other in pairs, while additionally each supporting part 41, 42, 43, 44 is pressed in Z-direction (vertical direction transverse to longitudinal axis L) against the base 100 of the guide rail 10.

When using transversely extending supporting parts 51, 52 (see embodiments in FIGS. 10-14A,B) the supporting parts 51, 52 are tensed against each other in X-direction, by pressing them towards each other and simultaneously each supporting part 51, 52 is pressed in Y- and Z-direction against the first guide rail 10.

The supporting parts 41, 42, 43, 44 are welded under tension in position to the first guide rail 10.

In a second assembly step the adjusting mechanism 2 is then positioned between the supporting parts 41, 42, 43, 44 on the first guide rail 10. In a third assembly step the lower, second guide rail 11 is slid onto the first guide rail 10 along the longitudinally axis L, and in a forth assembly step the spindle 3 is inserted also along the longitudinally axis L into the space formed between the guide rails 10, 11, is threaded through between the supporting parts 41, 42, is positioned on the adjusting mechanism 2 and inserted into the adjusting mechanism 2 and further passed through the supporting parts 43, 44. In the last, fifth assembly step the spindle 3 is then torque-proof connected to the lower, second guide rail 11 by a corresponding spindle fastening bracket 6, which are schematically indicated in FIG. 15.

In order to elevate the positioning of the spindle 3 on the adjusting mechanism 3, the lower, second guide rail 11 can be move into a position posterior relative to the first guide rail 10 such that the spindle 3 can be positioned in an easy manner on the adjusting mechanism 2. In order to bring the spindle 3 into engagement with the spindle nut 23 (see FIGS. 3 and 4) the positioning of the spindle 3 occurs preferably by driving this spindle nut 23 and putting the same into a rotational movement such that the spindle 3 is automatically pulled into the adjusting mechanism 2.

The different assembly directions are illustrated in FIG. 15. While the adjusting mechanism 2 is positioned in a assembly direction M1 vertical from below on the first guide rail 10, the assembly of the second guide rail 11 on the first guide rail 10 and on the spindle 3 occurs in assembly directions M2, M3 along the longitudinally axis L. The fastening brackets 6 are positioned from both sides on the arrangement in order to connect the spindle 3 torque-proof to the lower, second guide rail 11.

The assembly method schematically illustrated in FIG. 15 can be preferably used, if a positioning of the spindle 3 from below on the first guide rail 10 is not possible, for instance if the supporting parts 41, 42, 43, 44 according to the kind illustrated in FIG. 6 are closed downwards such that the spindle 3 has to be threaded through in a assembly direction M3 between the supporting parts 41, 42, 43, 44. This assembly method is preferably used also when using supporting parts of the type illustrated in FIGS. 10-14.

If the supporting parts 41, 42, 43, 44 do not oppose the positioning of the spindle 3 from below then also a modified assembly method schematically illustrated in FIG. 16 can be used. Hereby the supporting parts 41, 42, 43, 44 are again welded to the first guide rail 10 in a first working step in order to position the adjusting mechanism 2 with spindle 3 already arranged thereon subsequently in a second working step from below in assembling direction M1 on the first guide rail 10. In a third working step the second guide rail 11 is slided onto the first guide rail 10 and the spindle 3 is connected torque-proof to the second guide rail 11 with fastening brackets in a forth working step.

The advantage of a the second variant is that the positioning of the spindle 3 can occur outside of the guide rails 10, 11 and is thus simplified since a laborious threading into the space formed between the guide rails 10, 11 is not required.

A laser welding method can be preferably used for connecting the supporting parts 41, 42, 43, 44 or 51, 52 to the first guide rail 10, what allows for a cost efficient, simple, and easily automatable connection of the supporting parts 41, 42, 43, 44 or 51, 52 to the first guide rail 10. Other welding methods can also be used without problems.

The basic idea of the invention is not restricted to the previously described embodiments, but can be basically also realized by completely different embodiments. Thus, for instance supporting parts of a different shape and different extension can also be used. Furthermore, the application of an adjusting device of this kind is not restricted to a seat longitudinally adjustment of a vehicle seat, but can also basically be used in other adjusting devices, in which to guide rails are guided moveably along each other in a longitudinally direction via a spindle mechanism.

LIST OF REFERENCE SIGNS 1 guide rail pair
10 first guide rail
100 base
101, 102 leg
103, 104 edge section
11 second guide rail
110 base
111, 102 leg
113, 114 edge section
141, 142, 143, 143 opening
151, 152, 153, 154 opening
2 Adjusting mechanism
20 Housing
21, 22 bearing element
23 spindle nut
230 internal thread
24 driving worm
3 Spindle
31 external thread
41, 42, 43, 44 supporting part
41", 42" supporting part
410, 430 connecting section
411, 421, 431, 441 form lock section
412, 413 resting section
414 supporting section
415 surface section
416 form lock section
417 Opening
418 arch section
51, 52 supporting part
510 connecting section
511, 521 engaging section
512, 522 form lock section
515 opening
516, 526 surface section
517, 527 supporting section
518, 528 flap
519, 529 resting section
6 Spindle fastening bracket
A space
B distance
I internal space
L longitudinal axis
M1, M2, M3 assembly direction
S clearance

The invention claimed is:

1. An adjusting device for adjusting two vehicle parts relative to each other, the adjusting device comprising:

a first guide rail longitudinally extending along a longitudinal axis, the first guide rail being formed by a base and a pair of legs connected to the base;

a second guide rail movably arranged on the first guide rail and longitudinally extending along the longitudinal axis;

an adjusting mechanism arranged between the legs of the first guide rail, which comprises a spindle nut, which can be set into a rotational movement about the longitudinal axis for driving the adjusting device;

a spindle arranged in a rotationally fixed manner on the second guide rail and longitudinally extending along the longitudinal axis, which engages with the spindle nut in such a way that, when the spindle nut is rotated the first guide rail is moved along the longitudinal axis relative to the second guide rail; and a fastening device for fastening the adjusting mechanism to the first guide rail, wherein the fastening device comprises at least two supporting parts formed separately from each other, wherein, when viewed along the direction of the longitudinal axis, at least one of the at least two supporting parts is arranged in front of the adjusting mechanism and at least one of the at least two supporting parts is arranged behind the adjusting mechanism between the legs on the first guide rail, wherein the at least two supporting parts are welded to at least one of the base and a second of the legs of the first guide rail, wherein the at least two supporting parts each have a supporting section extending in a plane transverse to the longitudinal axis, wherein the supporting parts each flatly support the adjusting mechanism via a side of the supporting section facing the adjusting mechanism, wherein the supporting parts each reach into an opening in a first of the legs of the first guide rail, wherein the supporting parts are arranged with a clearance in the associated opening in the first leg of the first guide rail such that the supporting parts do not rest against the first leg of the first guide rail in a normal operating condition of the adjusting device, but are constituted to come into contact with the first leg of the first guide rail only during a deformation of the first guide rail or the supporting parts in case of a crash, and wherein the at least two supporting parts each comprise at least one form lock section extending from said supporting section and engaging with an opening on one of the base and the second leg of the first guide rail and extending through the opening to protrude from the base or the second leg at a side facing away from the adjusting mechanism arranged between the legs of the first guide rail.

2. The adjusting device according to claim 1, wherein the at least two supporting parts are each supported in a form locking manner by the at least one form lock section in the direction of the longitudinal axis at the first guide rail.

3. The adjusting device according to claim 1, wherein the at least two supporting parts each are welded, via the at least one form lock section, to the first guide rail.

4. The adjusting device according to claim 1, wherein the at least two supporting parts are welded to the first guide rail in each case via a resting section, via which the supporting part rests against one of the base and the second leg of the first guide rail and which differs from the at least one form lock section.

5. The adjusting device according to claim 1, wherein the at least two supporting parts are welded to one of an inner side of the base pointing to the adjusting mechanism and the second leg.

6. The adjusting device according to claim 1, wherein the at least two supporting parts rest with a resting section of a surface section aligned along the longitudinal axis against the first guide rail.

7. An adjusting device for adjusting two vehicle parts relative to each other, the adjusting device comprising:

a first guide rail longitudinally extending along a longitudinal axis, the first guide rail being formed by a base and a pair of legs connected to the base;

a second guide rail movably arranged on the first guide rail and longitudinally extending along the longitudinal axis;

an adjusting mechanism arranged between the legs of the first guide rail, which comprises a spindle nut, which can be set into a rotational movement about the longitudinal axis for driving the adjusting device;

a spindle arranged in a rotationally fixed manner on the second guide rail and longitudinally extending along the longitudinal axis, which engages with the spindle nut in such a way that, when the spindle nut is rotated the first guide rail is moved along the longitudinal axis relative to the second guide rail; and a fastening device for fastening the adjusting mechanism to the first guide rail, wherein the fastening device comprises at least two supporting parts formed separately from each other, wherein, when viewed along the direction of the longitudinal axis, at least one of the at least two supporting parts is arranged in front of the adjusting mechanism and at least one of the at least two supporting parts is arranged behind the adjusting mechanism between the legs of the first guide rail, wherein the at least two supporting parts are welded to at least one of the base and a second of the legs of the first guide rail, wherein the at least two supporting parts each have a supporting section extending in a plane transverse to the longitudinal axis, wherein the supporting parts each flatly support the adjusting mechanism via a side of the supporting section facing the adjusting mechanism, wherein the supporting parts each reach into an opening in a first of the legs of the first guide rail, wherein the supporting parts are arranged with a clearance in the associated opening in the first leg of the first guide rail such that the supporting parts do not rest against the first leg of the first guide rail in a normal operating condition of the adjusting device, but are constituted to come into contact with the first leg of the first guide rail only during a deformation of the first guide rail or the supporting parts in case of a crash, and wherein the at least two supporting parts are welded to the second leg of the first guide rail.

8. The adjusting device according to claim 7, wherein the supporting parts each have a form lock section, which reaches through the base of the first guide rail and which projects outwards beyond the base.

* * * * *